United States Patent
Shibata et al.

(10) Patent No.: US 10,411,527 B2
(45) Date of Patent: Sep. 10, 2019

(54) LINEAR MOTOR

(71) Applicant: THK CO., LTD., Tokyo (JP)

(72) Inventors: Hitoshi Shibata, Tokyo (JP); Hiroshi Kaneshige, Tokyo (JP); Katsuya Fukushima, Tokyo (JP); Masashi Sugiura, Tokyo (JP); Koichiro Morita, Tokyo (JP)

(73) Assignee: THK Co., Ltd., Tokyo (JP)

( * ) Notice: Subject to any disclaimer, the term of this patent is extended or adjusted under 35 U.S.C. 154(b) by 279 days.

(21) Appl. No.: 15/529,609

(22) PCT Filed: Nov. 11, 2015

(86) PCT No.: PCT/JP2015/081686
§ 371 (c)(1),
(2) Date: May 25, 2017

(87) PCT Pub. No.: WO2016/103946
PCT Pub. Date: Jun. 30, 2016

(65) Prior Publication Data
US 2017/0264146 A1    Sep. 14, 2017

(30) Foreign Application Priority Data

Dec. 25, 2014 (JP) ................................ 2014-262179

(51) Int. Cl.
*H02K 1/14* (2006.01)
*H02K 41/03* (2006.01)
(Continued)

(52) U.S. Cl.
CPC ............. *H02K 1/141* (2013.01); *H02K 1/16* (2013.01); *H02K 29/03* (2013.01); *H02K 41/03* (2013.01);
(Continued)

(58) Field of Classification Search
CPC ........ H02K 1/141; H02K 1/143; H02K 41/03; H02K 41/031
See application file for complete search history.

(56) References Cited

U.S. PATENT DOCUMENTS 6,552,460 B2    4/2003  Bales
6,856,050 B2 *  2/2005  Flechon ............. B65H 54/2833
                                                   242/481.2
(Continued)

FOREIGN PATENT DOCUMENTS

CN    1930765     3/2007
JP    64-047258   2/1989
(Continued)

OTHER PUBLICATIONS

Korean Patent Application No. 10-2017-7016809; dated Aug. 7, 2017.
(Continued)

Primary Examiner — Jeremy A Luks
(74) Attorney, Agent, or Firm — Young & Thompson (57) ABSTRACT

Disclosed is a linear motor that can exert a high propulsive force and reduce cogging. A stator has a plurality of core units in a stroke direction. Each of the core units has a first core having a first magnetic pole and a second magnetic pole, which is different in polarity from the first magnetic pole, coils wound around the first core, a second core having a third magnetic pole and a fourth magnetic pole, which is different in polarity from the third magnetic pole, and coils wound around the second core. The third magnetic pole faces the first magnetic pole, and the fourth magnetic pole faces the second magnetic pole. A movable element is sandwiched between the first magnetic poles and the third magnetic poles, and between the second magnetic poles and the fourth magnetic poles.

20 Claims, 9 Drawing Sheets

(51) Int. Cl.
  *H02K 1/16* (2006.01)
  *H02K 29/03* (2006.01)
  *H02K 11/21* (2016.01)

(52) U.S. Cl.
  CPC ........... *H02K 41/031* (2013.01); *H02K 11/21* (2016.01); *H02K 2213/03* (2013.01)

(56) References Cited

U.S. PATENT DOCUMENTS

| | | | |
|---|---|---|---|
| 6,960,846 B2 * | 11/2005 | Uchida | G03F 7/70758 310/12.17 |
| 7,365,456 B2 * | 4/2008 | Uchida | B82Y 10/00 310/12.06 |
| 7,656,062 B2 * | 2/2010 | Binnard | G03F 7/70758 310/12.05 |
| 7,990,084 B2 | 8/2011 | Kim | |
| 2007/0170786 A1 | 7/2007 | Miyamoto et al. | |
| 2009/0302786 A1 | 12/2009 | Kim | |
| 2011/0109185 A1 | 5/2011 | Sullivan et al. | |
| 2011/0248579 A1 | 10/2011 | Aoyama | |
| 2012/0280579 A1 * | 11/2012 | Carlmark | H02K 41/031 310/12.24 |
| 2013/0026859 A1 | 1/2013 | Bae | |
| 2013/0082545 A1 | 4/2013 | Goto et al. | |
| 2014/0312717 A1 * | 10/2014 | Angelis | H02K 41/031 310/12.22 |

FOREIGN PATENT DOCUMENTS

| | | |
|---|---|---|
| JP | H10-174418 | 6/1998 |
| JP | 2000-041373 | 2/2000 |
| JP | 2002-125360 | 4/2002 |
| JP | 2004-172557 | 6/2004 |
| JP | 2005-269822 | 9/2005 |
| JP | 2006-054974 | 2/2006 |
| JP | 2010-183651 | 8/2010 |
| JP | 2011-223697 | 11/2011 |
| KR | 20030006165 A | 1/2003 |
| KR | 20090126463 A | 12/2009 |
| KR | 20130013963 A | 2/2013 |
| WO | WO 2007/105319 | 9/2007 |
| WO | WO 2011/155022 | 12/2011 |

OTHER PUBLICATIONS

German Office Action dated Feb. 22, 2018 in corresponding German Patent Application No. 112015005778.1 with English translation of German Office Action.
International Search Report, PCT/JP2015/081686, dated Feb. 2, 2016.

* cited by examiner

DRAWING VIEWED FROM THE DIRECTION OF THE ARROW C

FIG. 3

DRAWING VIEWED FROM THE DIRECTION OF THE ARROW A

FIG. 4

DRAWING VIEWED FROM THE DIRECTION OF THE ARROW B

CROSS-SECTIONAL VIEW TAKEN ALONG THE LINE D-D

LINEAR MOTOR

TECHNICAL FIELD

The present invention relates to a linear motor that has a second member movable relative to a first member in a direction.

BACKGROUND ART

A synchronization-type linear motor that uses a magnet as a field system is known. This linear motor includes a movable element having a magnet, and a stator (stationary element) having a core and a coil wound around the core. The core has a salient pole that faces the magnet of the movable element. A coil is wound around the salient pole. A typical coil is a three-phase coil. When a three-phase alternating current, with a 120-degree difference between each two phases, flows through the three-phase coil, an interaction of a magnetic flux generated in the magnet and a magnetic flux generated in the core causes the movable element to move relative to the stator in a direction.

In a conventional linear motor, the core of the stator faces the magnet of the movable element, and therefore there is a problem, i.e., a magnetically attractive force that is greater than a propulsive force acts between the core and the magnet. In order to reduce the magnetically attractive force, Patent Literature Document 1 discloses a so-called tunnel-type linear motor that has a movable element moving in a space closed by a core of a stator. The feature of this linear motor resides in the structure of the core. Specifically, the core of the stator has a first facing portion, with upper magnetic pole teeth and lower magnetic pole teeth facing each other, and a second facing portion, with upper magnetic pole teeth and lower magnetic pole teeth facing each other. The first facing portion and the second facing portion are alternately formed such that the polarity of the first facing portion is opposite the polarity of the second facing portion. When a current flows through the coil, a magnetic flux that alternates up and down is generated in the space sandwiched between the upper magnetic pole teeth and the lower magnetic pole teeth of the first and second facing portions. The movable element moves through the magnetic flux tunnel.

As another invention to reduce the attractive force that acts on the core of the stator and the magnet of the movable element, Patent Literature Document 2 discloses a linear motor that has two stators above and below the movable element (see Patent Literature Document 2, FIG. 8). The movable element has a yoke, which is made from a magnetic material, and a magnet disposed on the yoke. Each of the two stators has a core and a coil wound around a salient pole of the core. Because the two stators are disposed above and below the movable element respectively, the attractive force acting between the upper stator and the movable element can be counterbalanced by an attractive force acting between the lower stator and the movable element.

LISTING OF REFERENCES

Patent Literature Documents

Patent Literature Document 1: Japanese Patent Application Laid-Open Publication No. 2002-125360
Patent Literature Document 2: Japanese Patent Application Laid-Open Publication No. 2004-172557

SUMMARY OF THE INVENTION

Problems to be Solved by the Invention

However, the tunnel-type linear motor described in Patent Literature Document 1 has a problem that the magnetic circuit of the core is long and the magnetic saturation tends to occur in the core (i.e., the magnetic flux does not become strong even when the current flowing in the coil increases). If the magnetic saturation occurs in the core, it is not possible to increase the propulsive force no matter how much the current flows through the coil.

In the linear motor described in Patent Literature Document 2, the cogging or the fluctuation in the propulsive force of the linear motor occurs. Thus, there is a problem that it is difficult to position the table with high accuracy.

Accordingly, an object of the present invention is to provide a linear motor that can exert a high propulsive force and reduce the cogging.

Solution to the Problems

According to one aspect of the present invention, there is provided a linear motor comprising a first member and a second member movable relative to the first member in a direction, the first member including a plurality of core units in said direction, each said core unit including a first core having a first magnetic pole and a second magnetic pole, which is different in polarity from the first magnetic pole, coils wound around the first core, a second core having a third magnetic pole and a fourth magnetic pole, which is different in polarity from the third magnetic pole, and coils wound around the second core, the third magnetic pole facing the first magnetic pole, and the fourth magnetic pole facing the second magnetic pole, and the second member being sandwiched between the first magnetic poles and the third magnetic poles, and between the second magnetic poles and the fourth magnetic poles.

Advantageous Effects of the Invention

According to the present invention, it is possible to reduce a path of a magnetic flux of the first and second cores because the first cores and the second cores, which sandwich the second member therebetween, form the magnetic circuits. Because the coils are wound around each of the first and second cores, it is possible to increase a propulsive force. Because an attractive force acting on the first cores and an attractive force acting on the second cores have substantially the same magnitude and are directed in opposite directions, with the second member being interposed between the first cores and the second cores, it is possible to almost cancel an overall attractive force. Therefore, it is possible to reduce cogging. In addition, because a magnetic circuit is difficult to be formed across each two adjacent first cores in the direction or each two adjacent second cores in the direction, it is feasible to reduce noises due to magnetic leakage.

BRIEF DESCRIPTION OF THE DRAWINGS

FIG. 7 is a set of perspective views that show core units of a stator and two rows of magnets of the movable element in the linear motor according to the embodiment (FIG. 7A is an overall view, and FIG. 7B is an enlarged view of FIG. 7A).

FIG. 8 is a set of perspective views that show core units of a stator and magnets of a movable element in a conventional linear motor (FIG. 8A is an overall view, FIG. 8B is an enlarged view of FIG. 8A, and FIG. 8C is a side view).

MODE FOR CARRYING OUT THE INVENTION

A linear motor according to embodiments of the present invention will now be described with reference to the accompanying drawings. It should be noted that the linear motor of the present invention may be embodied in various forms and modes, and is not limited to the embodiments described in this specification. The embodiments are provided with the intention that a skilled person can sufficiently understand the scope of the invention as a result of providing sufficient disclosure in the specification.

Figure 1:
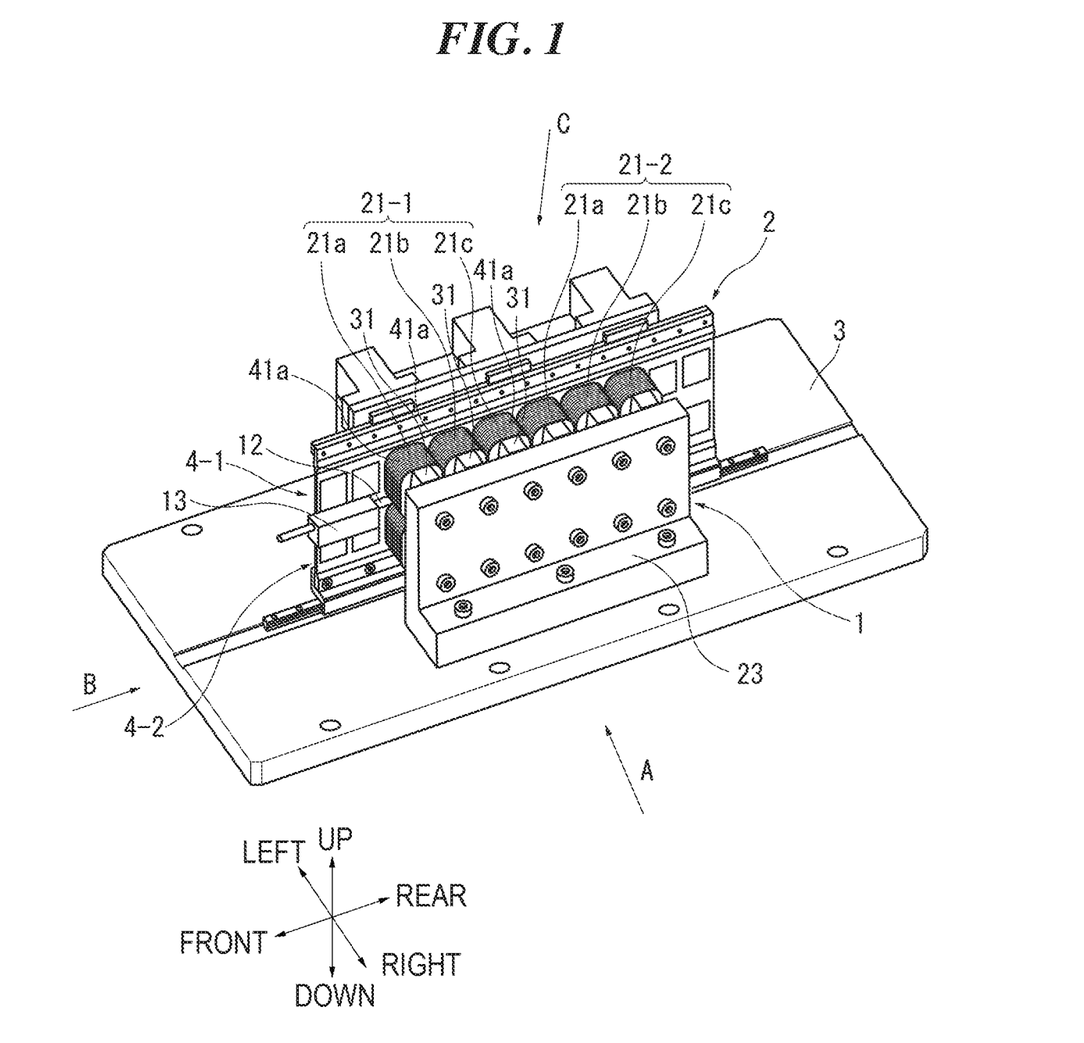
FIG. 1 is a perspective view of a linear motor according to a first embodiment of the present invention.
Figure 2:
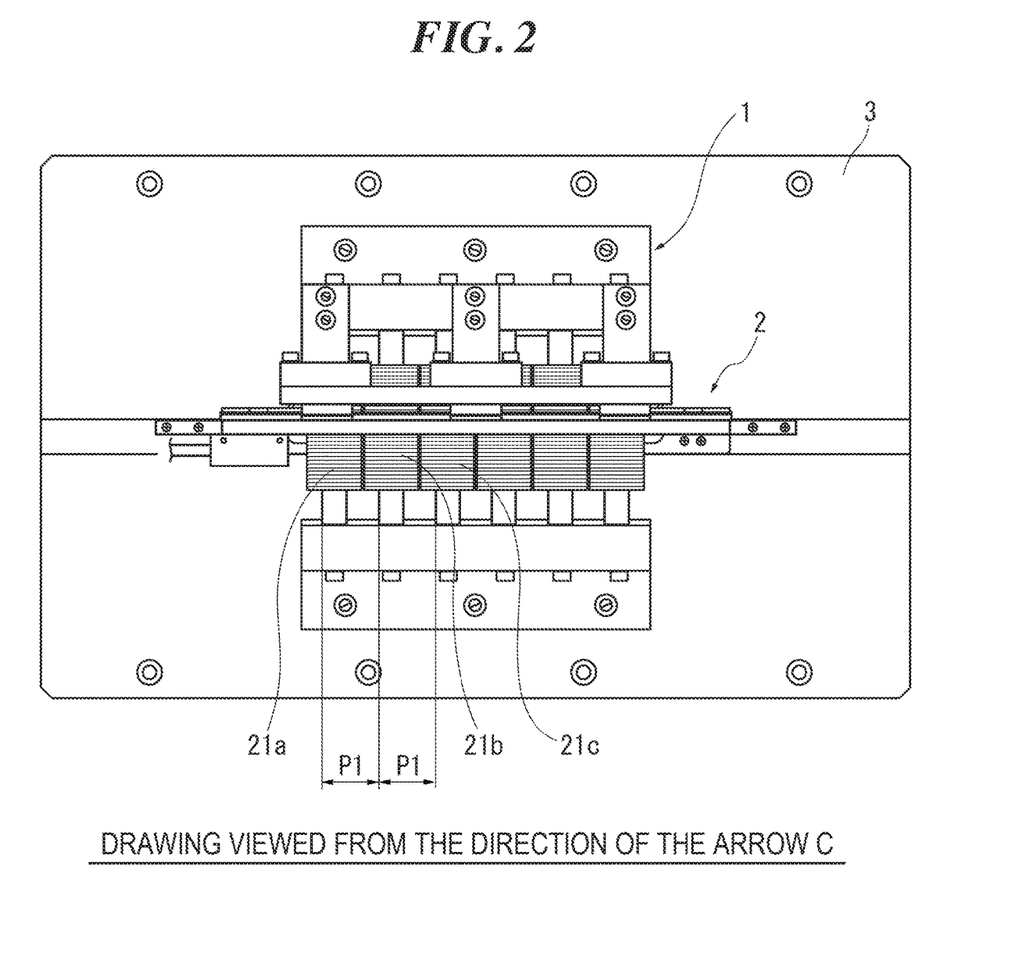
FIG. 2 is a view (plan view) as viewed from the direction of the arrow C in FIG. 1.
Figure 3:
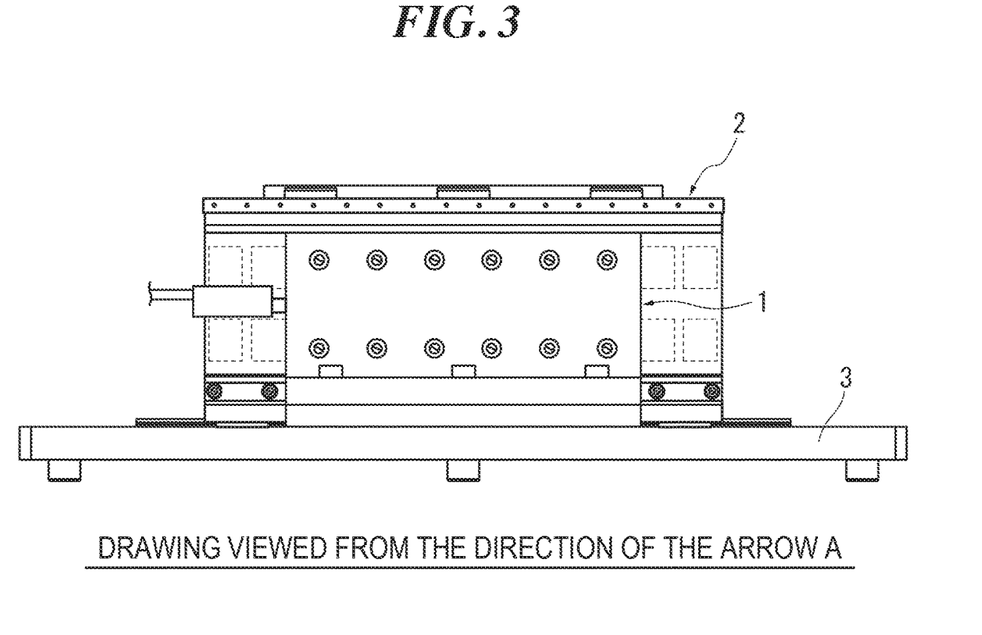
FIG. 3 is a view (side view) as viewed from the direction of the arrow A in FIG. 1.
Figure 4:
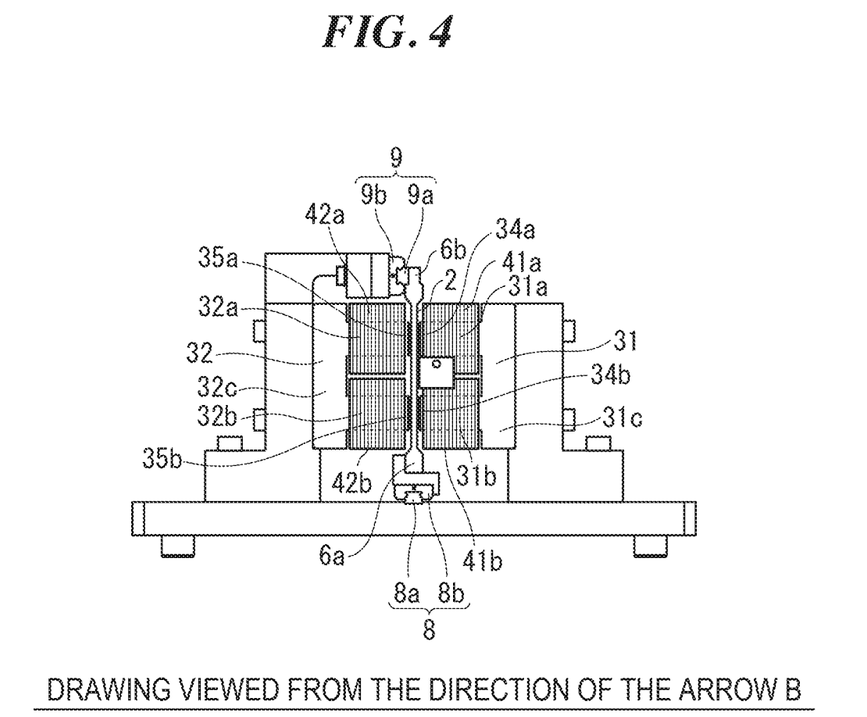
FIG. 4 is a view (side view) as viewed from the direction of the arrow B in FIG. 1.

FIG. 1 is a perspective view of a linear motor according to a first embodiment of the present invention, FIG. 2 is a view (plan view) as viewed from the direction of the arrow C in FIG. 1, FIG. 3 is a view (side view) as viewed from the direction of the arrow A in FIG. 1, and FIG. 4 is a view (side view) as viewed from the direction of the arrow B in FIG. 1. Same reference numerals are assigned to same elements and components in these drawings and throughout the specification.

As illustrated in FIG. 1, the linear motor includes a stator (stationary element) 1, which is a first member, and a movable element 2, which is a second member. The stator 1 is fixedly secured to a base 3. The movable element 2 is supported on the base 3 such that the movable element 2 can move in a direction (the direction of the arrow B, which is referred to as "stroke direction" hereinafter). It should be noted in the following description that for the sake of description, the configuration of the linear motor will be described using directions defined when the movable element 2 is viewed from the stroke direction, i.e., using right and left directions, up and down directions, and front and rear directions as indicated in FIG. 1. Of course, the arrangement of the linear motor is not limited to the illustrated right and left directions, the illustrated up and down directions, and the illustrated front and rear directions.

Figure 5:
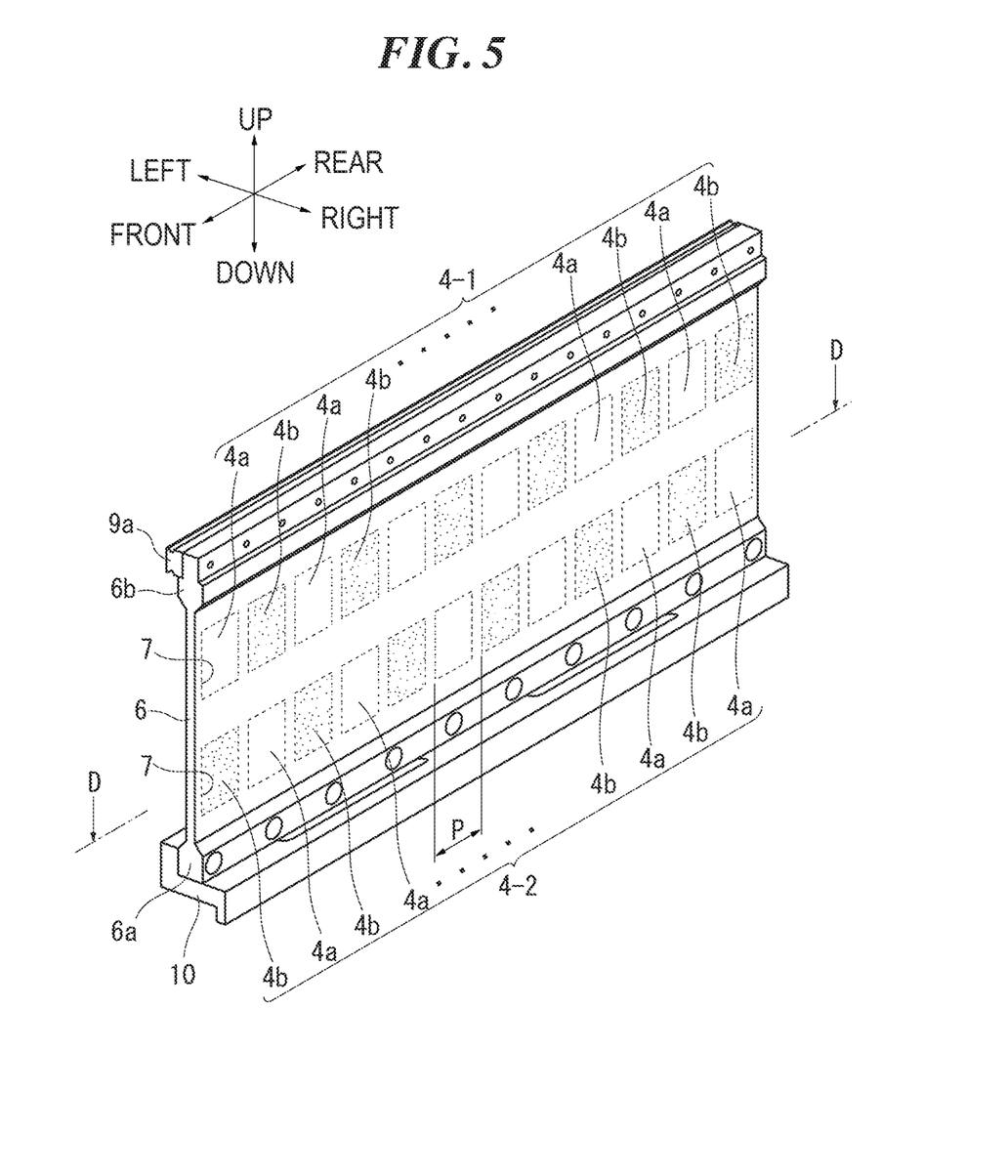
FIG. 5 is a perspective view of a movable element of the linear motor according to the embodiment.

The movable element 2 has the following configuration. FIG. 5 shows a perspective view of the movable element 2. The movable element 2 includes two rows of magnets 4-1 and 4-2, each row having a plurality of magnets 4a and 4b arranged in line. The two rows of magnets 4-1 and 4-2 are parallel to each other. In each of the rows of magnets 4-1, 4-2, the magnets 4a and 4b are arranged at constant pitches P in the stroke direction (in the front-rear direction in FIG. 5). The positions of the magnets 4a and 4b in the upper row of magnets 4-1 in the front-rear direction match the positions of the magnets 4a and 4b in the lower row of magnets 4-2 in the front-rear direction.

Each of the magnets 4a and 4b is shaped like a square or rectangular plate, and magnetized in the thickness direction of the magnet (right-left direction in FIG. 5). The right surface of the magnet 4a is an N pole and the left surface of the magnet 4a is an S pole. The right surface of the magnet 4b is an S pole and the left surface of the magnet 4b is an N pole. In FIG. 5, the dot pattern is depicted on the S pole of the magnet 4b. The polarities of the upper row of magnets 4-1 are N, S, N, S, N . . . in the front-rear direction. The polarities of the lower row of magnets 4-2 are S, N, S, N, S . . . in the front-rear direction. Thus, each two adjacent magnets 4a and 4b in the front-rear direction have opposite polarities. Similarly, each two adjacent magnets in the up-down direction have opposite polarities. It should be noted that the magnets 4a and 4b may be arranged skew (in an inclined manner).

A rectangular plate-like base member 6 has openings 7 to receive the magnets 4a and 4b. The base member 6 is made from a non-magnetic material such as duralumin. The base member 6 is thicker at opposite ends 6a and 6b in the width direction (up-down direction in FIG. 5) than at a center portion thereof. Linear guides 8 and 9 (see FIG. 4), which serve as support mechanisms, are attached to the opposite ends 6a and 6b, respectively. For example, a rail 9a of the linear guide 9 is attached to the upper end 6b of the base member 6. A block 8b of the linear guide 8 (see FIG. 4) is attached to the lower end 6a of the base member 6 via a bracket 10, which has an S shape in the cross-sectional view.

Figure 6:
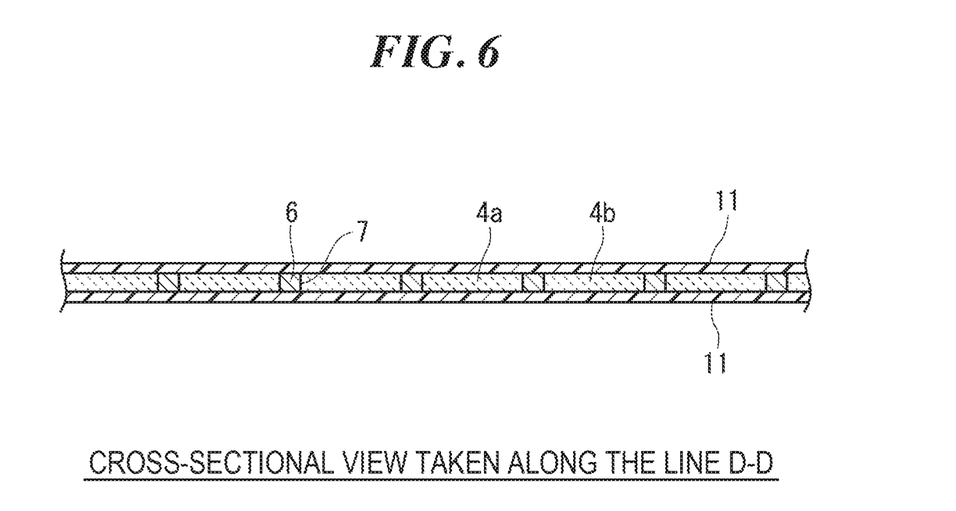
FIG. 6 is a cross-sectional view taken along the line D-D in FIG. 5.

FIG. 6 shows a cross-sectional view of the movable element 2, which is taken along the line D-D. As described above, the magnets 4a and 4b are received (fitted) in the openings 7 of the base member 6. A plate member or a sheet member 11 is affixed to the surface of the base member 6 by an adhesive agent. The plate member or the sheet member 11 is made from carbon-fiber-reinforced plastic (CFRP). Even when each of the magnets 4a and 4b is fitted in the associated opening 7 of the base member 6, the adhering area between the magnet 4a, 4b and the base member 6 is only the area of the frame (edge) of the opening 7 of the base member 6 that faces the magnet 4a, 4b. By adhering the plate member or the sheet member 11 to the base member 6, it is possible to prevent the magnets 4a and 4b from falling off from the base member 6.

As illustrated in FIG. 1, a scale 12 is disposed between the upper row of magnets 4-1 and the lower row of magnets 4-2 of the movable element 2 for detecting the position of the movable element 2. A sensor 13 is attached to the stator 1 such that the sensor operates with the scale 12 to generate a position signal. The scale 12 and the sensor 13 constitute, in combination, an encoder. The position signal of the sensor 13 is used in, for example, a known feed-back control.

The stator 1 has the following configuration. As shown in FIG. 1, the stator 1 has a plurality of core units 21a-21c arranged in the stroke direction (front-rear direction in FIG. 1). The core units 21a-21c are mounted on an L-shaped stand or frame 23 secured on the base 3.

In this embodiment, two armatures 21-1 and 21-2 are arranged in the stator 1. The linear motor is a three-phase linear motor, and the core units of each of the armatures 21-1 and 21-2 are categorized into a U-phase core unit 21a, a V-phase core unit 21b, and a W-phase core unit 21c. When the pole pitch of the magnets 4a and 4b is P (see FIG. 5), the pitch P1 (see FIG. 2) between the adjacent core units 21a and 21b is 2P/3, 4P/3 or the like. The pitch between the adjacent core units 21b and 21c is also P1. It should be noted that the number of the phases of the linear motor is not limited to three, and the linear motor may be a two-phase linear motor, a four-phase linear motor, a five-phase linear motor, or the like. Also, the number of the armatures 21-1, 21-2 is not limited to two, and it may be one, three, four or the like.

As shown in FIG. 4, the core unit 21a has a first core 31 and a second core 32, which sandwich the movable element 2. The first core 31 is shaped like "C" and has a base portion 31c and two salient poles 31a and 31b protruding from the base portion 31c toward the movable element 2. As shown in FIG. 1, the first cores 31 are spaced from each other in the stroke direction (front-rear direction in FIG. 1). It should be noted that a non-magnetic substance may be placed between each two adjacent first cores 31. The first core 31 is made from a laminated steel plate.

Figure 7A:
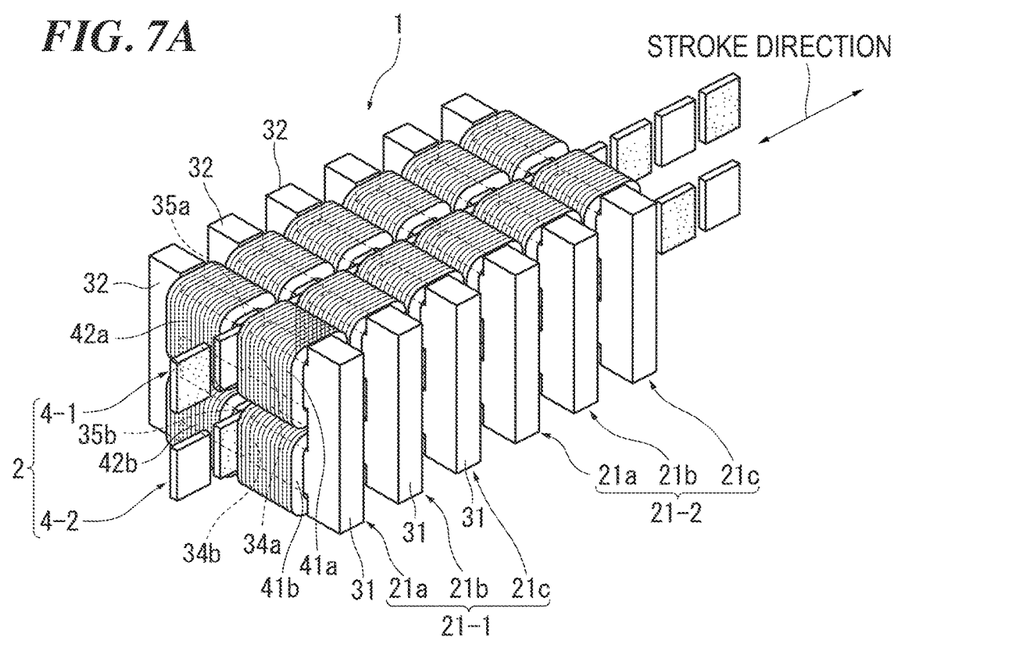

As shown in FIG. 4, two coils 41a and 41b are wound around the two salient poles 31a and 31b of the first core 31, respectively. Specifically, as shown in FIG. 7A, U-phase coils 41a and 41b are wound around the first core 31 of the U-phase core unit 21a, V-phase coils 41a and 41b are wound around the first core 31 of the V-phase core unit 21b, and W-phase coils 41a and 41b are wound around the first core 31 of the W-phase core unit 21c. As shown in FIG. 4, when a current is caused to flow through the coil 41a, a first magnetic pole 34a (for example, an N pole) is formed at a free end of the salient pole 31a, and a second magnetic pole 34b, which is different in polarity from the first magnetic pole 34a (for example, an S pole), is formed at a free end of the salient pole 31b. The alternating current of the same phase flows into the two coils 41a and 41b in order to enhance the first and second magnetic poles 34a and 34b. The polarities of the first and second magnetic poles 34a and 34b are periodically inverted.

As illustrated in FIG. 4, the second core 32 is also shaped like "C" and has a base portion 32c and two salient poles 32a and 32b protruding from the base portion 32c toward the movable element 2. The second cores 32 are spaced from each other in the stroke direction (see FIG. 7A). It should be noted that a non-magnetic substance may be placed between each two adjacent second cores 32. The second core 32 is made from a laminated steel plate.

Two coils 42a and 42b are wound around the two salient poles 32a and 32b of the second core 32, respectively. Specifically, as shown in FIG. 7A, U-phase coils 42a and 42b are wound around the second core 32 of the U-phase core unit 21a, V-phase coils 42a and 42b are wound around the second core 32 of the V-phase core unit 21b, and W-phase coils 42a and 42b are wound around the second core 32 of the W-phase core unit 21c. As shown in FIG. 4, when a current is caused to flow through the coils 42a and 42b, a third magnetic pole 35a (for example, an S pole) is formed at a free end of the salient pole 32a, and a fourth magnetic pole 35b, which is different in polarity from the third magnetic pole 35a (for example, an N pole), is formed at a free end of the salient pole 32b. The alternating current of the same phase flows into the two coils 42a and 42b in order to enhance the third and fourth magnetic poles 35a and 35b. The polarities of the third and fourth magnetic poles 35a and 35b are periodically inverted.

The first magnetic pole 34a is different in polarity from the third magnetic pole 35a, and a magnetic flux flows between the first magnetic pole 34a and the third magnetic pole 35a. The second magnetic pole 34b is different in polarity from the fourth magnetic pole 35b, and a magnetic flux flows between the second magnetic pole 34b and the fourth magnetic pole 35b. The direction of the magnetic flux between the first magnetic pole 34a and the third magnetic pole 35a is opposite the direction of the magnetic flux between the second magnetic pole 34b and the fourth magnetic pole 35b. The first core 31 and the second core 32 constitute, in combination, a magnetic circuit 51 (see FIG. 7B).

The movable element 2 is sandwiched between the first cores 31 and the second cores 32. The upper row of magnets 4-1 of the movable element 2 (see FIG. 5) is sandwiched between the first magnetic poles 34a and the third magnetic poles 35a. The lower row of magnets 4-2 of the movable element 2 (see FIG. 5) is sandwiched between the second magnetic poles 34b and the fourth magnetic poles 35b.

As illustrated in FIG. 4, the linear guides 8 and 9 are attached to the opposite ends of the movable element 2 in the width direction (up-down direction in FIG. 4) such that the linear guides 8 and 9 guide the movements of the movable element 2. The linear guides 8 and 9 have rails 8a and 9a, and blocks 8b and 9b that move along the rails 8a and 9a, respectively. The linear guides are known in the art, and there are many rolling elements between the rail 8a and the block 8b and between the rail 9a and the block 9b such that the rolling elements can perform the rolling motion. The opposite ends 6a and 6b of the movable element 2 in the width direction (up-down direction in FIG. 4) protrude outward from the first and second cores 31 and 32. The linear guides 8 and 9 attached to the opposite ends 6a and 6b of the movable element 2 are also positioned outside the first and second cores 31 and 32. It should be noted that ball splines, ball bushings or the like may be used instead of the linear guides 8 and 9.

Figure 7B:
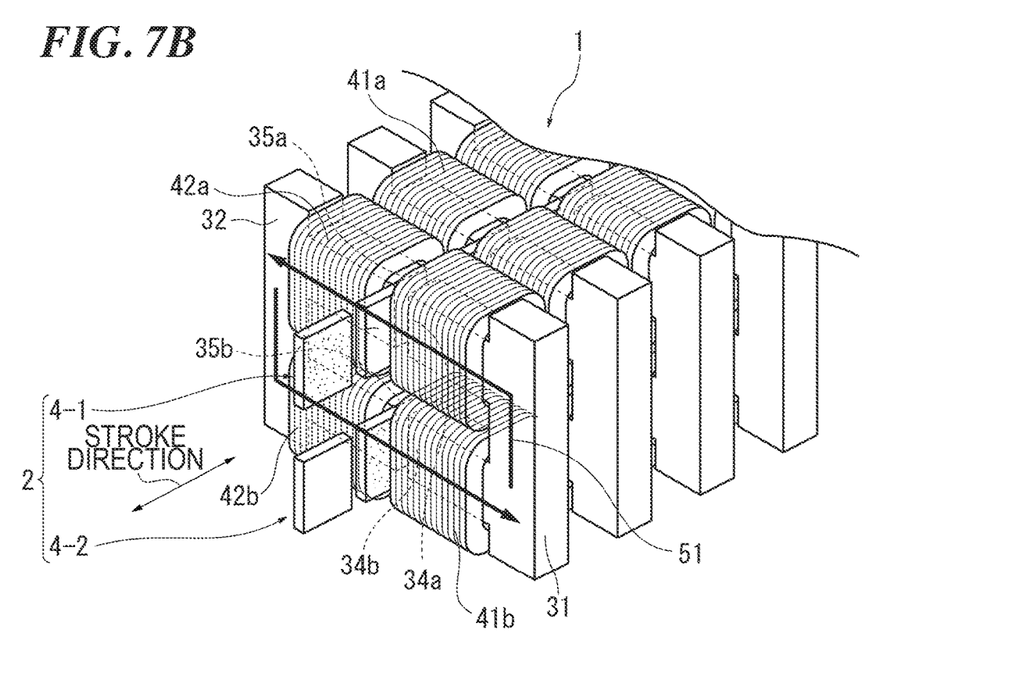

FIG. 7A is a perspective view that shows the core units 21a-21c of the stator 1 and the two rows of magnets 4-1 and 4-2 of the movable element 2. FIG. 7B is an enlarged view of FIG. 7A. As described above, the first magnetic pole 34a of the first core 31 is different in polarity from the second magnetic pole 34b of the first core. Similarly, the third magnetic pole 35a of the second core 32 is different in polarity from the fourth magnetic pole 35b of the second core. Furthermore, the first magnetic pole 34a is different in polarity from the third magnetic pole 35a, and the second magnetic pole 34b is different in polarity from the fourth magnetic pole 35b. When the current flows in the four coils 41a, 41b, 42a and 42b of each of the core units, the magnetic flux flows to the third magnetic pole 35a from the first magnetic pole 34a, and the magnetic flux flows to the second magnetic pole 34b from the fourth magnetic pole 35b. Then, the magnetic circuit 51 is formed by the first core 31 and the associated second core 32. When the alternating current flows in the U-phase core unit 21a, the V-phase core unit 21b and the W-phase core unit 21c at the 120-degree phase difference respectively, the interaction between the magnetic circuits 51 and the magnetic fluxes of the magnet rows 4-1 and 4-2 of the movable element 2 causes the movable element 2 to move in the stroke direction.

The linear motor of this embodiment has the following advantages. Because each of the magnetic circuits 51 is formed by the first core 31 and the associated second core 32, which sandwich the movable element 2, it is possible to reduce the path of the magnetic flux of the first and second cores 31 and 32. Because the coils 41a, 41b, 42a and 42b are wound around the first and second cores 31 and 32, respectively, it is possible to increase the propulsive force. Because the attractive forces that act on the first cores 31 and the attractive forces that act on the second cores 32 sandwiching the movable element 2 have substantially the same magnitude but are directed in opposite directions, it is possible to substantially cancel the entire attractive forces. Thus, it is possible to reduce the cogging. In addition, because it is unlikely that the magnetic circuit is formed between each two adjacent first cores 31 in the stroke direction of the movable element 2 or between each two adjacent second cores 32 in the stroke direction of the movable element 2, it is possible to reduce noises due to magnetic leakage.

Figures 8A, 8B:
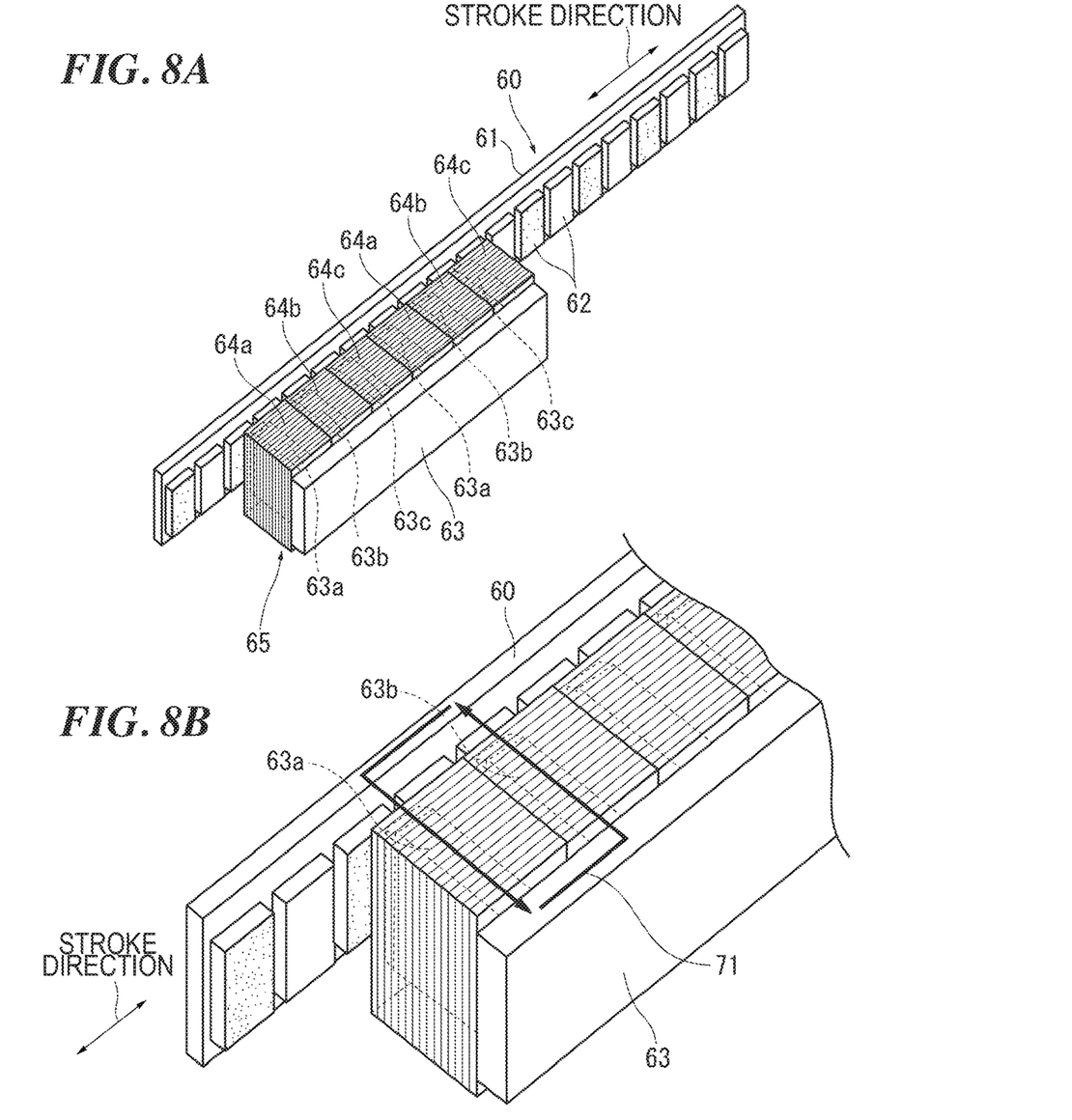
Figure 8C:
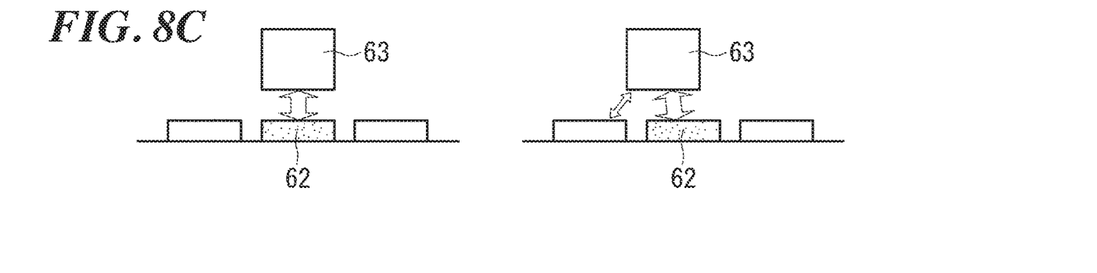

The reason why the cogging can be reduced will be described with reference to a comparative example shown in FIG. 8. FIG. 8A shows a conventional linear motor. A stator 60 of this linear motor has a yoke 61, which is made from a magnetic material, and a plurality of magnets 62, which are arranged on the yoke 61. A movable element 65 includes a core 63, which has U-phase, V-phase and W-phase salient poles 63a-63c and faces the magnets 62, and also includes U-phase, V-phase and W-phase coils 64a-64c wound around the salient poles 63a-63c respectively. In the conventional linear motor, as depicted in FIG. 8C, a magnetic attractive force acts between the magnets 62 and the core 63. When the magnets 62 are immediately below the core 63 (see the left illustration in FIG. 8C), the attractive force is magnetically stable and therefore no cogging occurs. However, when the core 63 shifts from the stable position (see the right illustration in FIG. 8C), the core 63 attempts to return to the original position, and the cogging occurs. In the linear motor of this embodiment, as depicted in FIG. 7B, the first cores 31 and the second cores 32 are disposed to sandwich the movable element 2, and therefore the magnetic attractive forces are cancelled and the cogging is reduced.

In the conventional linear motor, as shown in the enlarged view of FIG. 8B, a magnetic circuit 71 is formed through each two adjacent salient poles among the U-phase, V-phase and W-phase salient poles 63a-63c in the stroke direction of the movable element 65, and noises are generated by magnetic flux leakage. In the linear motor of this embodiment, as shown in FIG. 7B, a magnetic circuit is difficult to be formed through each two adjacent first cores 31 or each two adjacent second cores 32 in the stroke direction of the movable element 2. Thus, it is possible to reduce noises due to the magnetic flux leakage.

The linear motor of this embodiment possesses further advantages as will be described below. The movable element 2 has the two magnet rows 4-1 and 4-2, one of the magnet rows 4-1 is located between the first magnetic poles 34a and the third magnetic poles 35a, and the other of the magnet rows 4-2 is located between the second magnetic poles 34b and the fourth magnetic poles 35b. Because the magnetic circuits 51 is formed orthogonally to the stroke direction and no magnetic circuits 51 are present in the stroke direction, the cogging is more reduced.

The first cores 31 of the core units 21a-21c are spaced from each other, and the second cores 32 of the core units 21a-21c are spaced from each other. Because the core units 21a-21c are independent from each other, it is possible to prevent a core unit of a particular phase (e.g., the U-phase core unit 21a) from being affected by the leaking magnetic flux of core units of other phases (e.g., the V-phase core unit 21b and the W-phase core unit 21c).

Because the base member 6 of the movable element 2 is made from a non-magnetic material, the first cores 31 and the second cores 32, between which the movable element 2 is located, can easily form the magnetic circuits.

Because the plate member or the sheet member 11 is adhered to the base member 6, it is possible to prevent the magnets 4a and 4b from falling off from the base member 6.

When the linear motor is viewed from the stroke direction, the opposite ends 6a and 6b of the movable element 2 in the width direction protrude outward from the first and second cores 31 and 32, and the linear guides 8 and 9 configured to guide the movements of the movable element 2 are disposed at the opposite ends 6a and 6b of the movable element 2 respectively. Therefore, it is possible to prevent the magnetic flux from leaking to the linear guides 8 and 9, and the linear guides 8 and 9 can guide the movements of the movable element 2 in a stable manner.

The two coils 41a and 41b are wound around the two salient poles 31a and 31b of each of the C-shaped first cores 31, respectively, and the two coils 42a and 42b are wound around the two salient poles 32a and 32b of each of the C-shaped second cores 32, respectively. Therefore, it is possible to position the coils 41a, 41b, 42a and 42b close to the movable element 2 and reduce the path of the magnetic flux.

Because the scale 12 is disposed between the two rows of magnets 4-1 and 4-2 of the movable element 2, it is possible to measure the position of the movable element 2 with high precision. This is because the scale 12 is disposed in the vicinity to an area to which the force of the movable element 2 is exerted.

Figure 9:
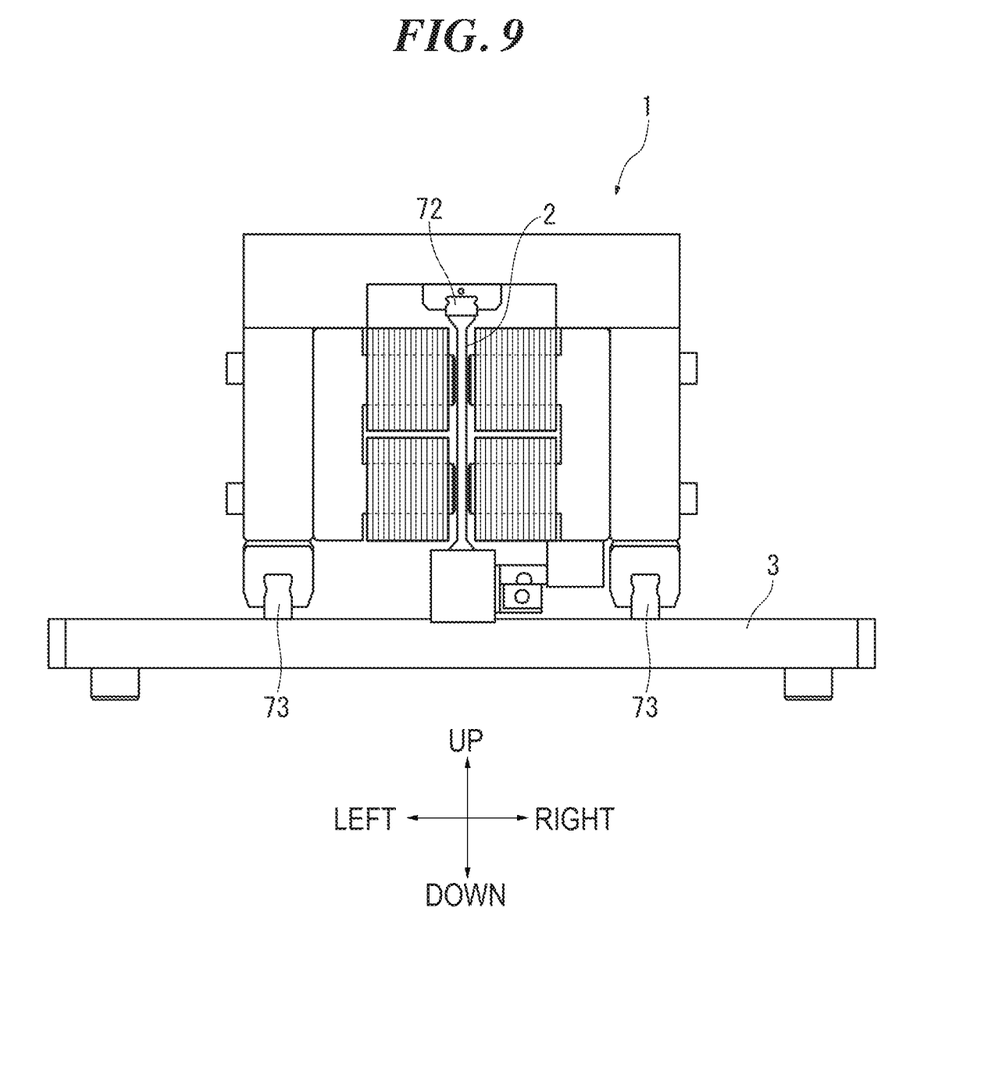
FIG. 9 is a side view of a linear motor according to a second embodiment of the present invention, when viewed from a stroke direction of the linear motor.

FIG. 9 illustrates a linear motor according to a second embodiment of the present invention. FIG. 9 is a side view of the linear motor, when viewed from the stroke direction. In the above-described first embodiment, the stator 1 is fixedly secured to the base 3, and the movable element 2 moves. In the second embodiment, the stator 1 moves and the movable element 2 is fixedly secured to the base 3. Other configurations of the linear motor of the second embodiment are substantially the same as the linear motor of the first embodiment. The lower end of the movable element 2 is fixedly secured to the base 3. Between the upper end of the movable element 2 and the stator 1, provided is a linear guide 72. Between the lower end of the stator 1 and the base 3, provided are linear guides 73. The movements of the stator 1 are guided by the linear guides 72 and 73.

It should be noted that embodiments of the present invention are not limited to the above-described embodiments. For example, although the two coils are wound around each of the first and second cores in the linear motor of each of the above-described embodiments, one coil may only be wound around each of the first and second cores.

Although a plurality of first cores are separated (spaced from each other) in the stroke direction in the linear motor of each of the above-described embodiments, the first cores may be connected to each other by magnetic materials if the easiness of the manufacturing of the first cores is taken into account. The same applies to a plurality of second cores.

Although the magnets are arranged on the movable element in the linear motor of each of the above-described embodiments, the coils may be arranged on the movable element instead of the magnets, or a plate having projections, which are made from a magnetic material, may be arranged on the movable element.

In the above-described embodiments, the example of the feedback control is described in which the position signal is fed back. Alternatively, an open loop control may be used, and the linear motor may be used as a linear stepping motor. Also, a position sensorless control may be employed.

This specification is based on Japanese Patent Application No. 2014-262179 filed on Dec. 25, 2014, and the entire disclosure and content of this application is incorporated herein by reference.

REFERENCE NUMERALS AND SYMBOLS

1 . . . Stator (first member), 2 . . . Movable element (second member), 3 . . . base, 4-1 . . . One row of magnets, 4-2 ... The other row of magnets, 4a, 4b ... Magnet, 6 ... Base member, 6a, 6b ... Opposite ends of the movable element, 7 ... Opening, 8, 9 ... Linear guide (support mechanism), 11 ... Plate member or sheet member, 12 ... Scale, 21-1, 21-2 ... Armature, 21a-21c ... Core unit, 31 ... First core, 31a, 31b ... Salient pole of the first core, 32 ... Second core, 32a, 32b ... Salient pole of the second core, 34a ... First magnetic pole, 34b ... Second magnetic pole, 35a ... Third magnetic pole, 35b ... Fourth magnetic pole, 41a, 41b, 42a, 42b ... Coil, 51 ... Magnetic circuit, 72, 73 ... Linear guide (support mechanism)

The invention claimed is:

1. A linear motor comprising a first member and a second member movable relative to the first member in a direction,
the first member including a plurality of core units in said direction, each said core unit including a first core being configured only by a core and having a first magnetic pole and a second magnetic pole, which is different in polarity from the first magnetic pole, coils wound around the first core, a second core being configured only by a core and having a third magnetic pole and a fourth magnetic pole, which is different in polarity from the third magnetic pole, and coils wound around the second core, the third magnetic pole facing the first magnetic pole, and the fourth magnetic pole facing the second magnetic pole,
the second member being sandwiched between the first magnetic poles and the third magnetic poles, and between the second magnetic poles and the fourth magnetic poles, and
a magnetic circuit being orthogonal to the direction is formed by the first core and the second core.

2. The linear motor according to claim 1, wherein the second member has two magnet rows, each said magnet row having a plurality of magnets arranged,
one of the two magnet rows is sandwiched between the first magnetic poles and the third magnetic poles,
the other of the two magnet rows is sandwiched between the second magnetic poles and the fourth magnetic poles, and
positions of the magnets in one of the two magnet rows in the direction match positions of the magnets in the other of the two magnet rows in the direction.

3. The linear motor according to claim 1, wherein the first cores are spaced from each other, or a non-magnetic material is interposed between each two adjacent said first cores, and
the second cores are spaced from each other, or a non-magnetic material is interposed between each two adjacent said second cores.

4. The linear motor according to claim 2, wherein the magnets of the second member are fixedly secured to a base member that is made from a non-magnetic material.

5. The linear motor according to claim 4, wherein the magnets of the second member are fitted in a plurality of openings of the base member, respectively, and
a plate member or a sheet member is adhered to the base member.

6. The linear motor according to claim 1,
wherein when the linear motor is viewed from said direction, opposite ends of the second member in a width direction of the second member protrude outward from the first cores and the second cores, and
support mechanisms configured to guide movements of the second member are disposed at said opposite ends of the second member, respectively.

7. The linear motor according to claim 1,
wherein each said first core has a C shape, and two coils are wound around two salient poles of each said first core, respectively, and
each said second core has a C shape, and two coils are wound around two salient poles of each said second core, respectively.

8. The linear motor according to claim 2,
wherein a scale configured to detect a position of the movable element is disposed between the two magnet rows.

9. The linear motor according to claim 2,
wherein the first cores are spaced from each other, or a non-magnetic material is interposed between each two adjacent said first cores, and
the second cores are spaced from each other, or a non-magnetic material is interposed between each two adjacent said second cores.

10. The linear motor according to claim 2, wherein when the linear motor is viewed from said direction, opposite ends of the second member in a width direction of the second member protrude outward from the first cores and the second cores, and
support mechanisms configured to guide movements of the second member are disposed at said opposite ends of the second member, respectively.

11. The linear motor according to claim 3, wherein when the linear motor is viewed from said direction, opposite ends of the second member in a width direction of the second member protrude outward from the first cores and the second cores, and
support mechanisms configured to guide movements of the second member are disposed at said opposite ends of the second member, respectively.

12. The linear motor according to claim 4, wherein when the linear motor is viewed from said direction, opposite ends of the second member in a width direction of the second member protrude outward from the first cores and the second cores, and
support mechanisms configured to guide movements of the second member are disposed at said opposite ends of the second member, respectively.

13. The linear motor according to claim 5, wherein when the linear motor is viewed from said direction, opposite ends of the second member in a width direction of the second member protrude outward from the first cores and the second cores, and
support mechanisms configured to guide movements of the second member are disposed at said opposite ends of the second member, respectively.

14. The linear motor according to claim 2, wherein each said first core has a C shape, and two coils are wound around two salient poles of each said first core, respectively, and
each said second core has a C shape, and two coils are wound around two salient poles of each said second core, respectively.

15. The linear motor according to claim 3, wherein each said first core has a C shape, and two coils are wound around two salient poles of each said first core, respectively, and
each said second core has a C shape, and two coils are wound around two salient poles of each said second core, respectively.

16. The linear motor according to claim 4, wherein each said first core has a C shape, and two coils are wound around two salient poles of each said first core, respectively, and
each said second core has a C shape, and two coils are wound around two salient poles of each said second core, respectively.

17. The linear motor according to claim 5, wherein each said first core has a C shape, and two coils are wound around two salient poles of each said first core, respectively, and each said second core has a C shape, and two coils are wound around two salient poles of each said second core, respectively.

18. The linear motor according to claim 6, wherein each said first core has a C shape, and two coils are wound around two salient poles of each said first core, respectively, and each said second core has a C shape, and two coils are wound around two salient poles of each said second core, respectively.

19. The linear motor according to claim 4, wherein a scale configured to detect a position of the movable element is disposed between the two magnet rows.

20. The linear motor according to claim 1, wherein the core units are categorized into a U-phase core unit, a V-phase core unit, and a W-phase core unit, in the U-phase core unit, the coils wound around the first core and the coils wound around the second core are U-phase coils, in the V-phase core unit, the coils wound around the first core and the coils wound around the second core are V-phase coils, in the W-phase core unit, the coils wound around the first core and the coils wound around the second core are W-phase coils, and in each of the U-phase core unit, V-phase core unit and the W-phase core unit, the first magnetic pole is different in polarity from the third magnetic pole, and the second magnetic pole is different in polarity from the fourth magnetic pole.

* * * * *